Aug. 2, 1927.  1,637,945
F. KERSHAW
VENEER DRIER
Filed Nov. 6, 1925   2 Sheets-Sheet 1
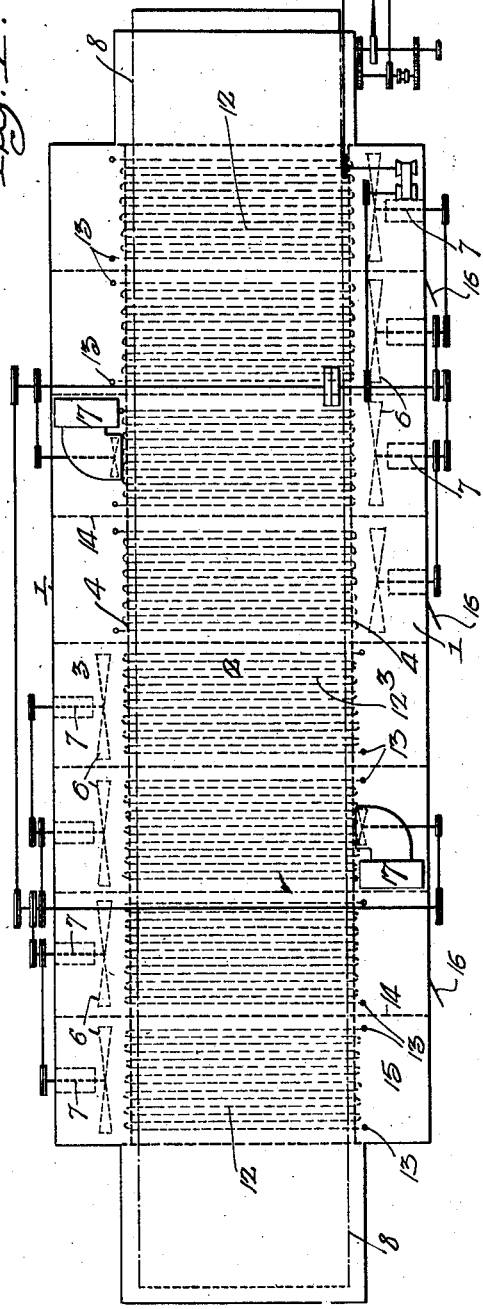
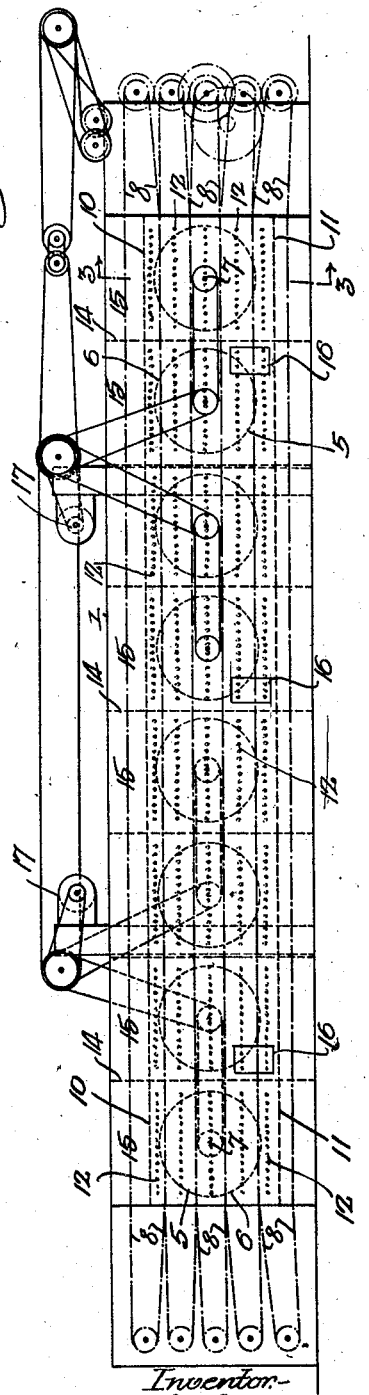
Inventor-
Frederick Kershaw.
by his Attorneys.
Howson + Howson Aug. 2, 1927.

F. KERSHAW

VENEER DRIER

Filed Nov. 6, 1925

Inventor—
Frederick Kershaw.
by his Attorneys.
Howson & Howson

Patented Aug. 2, 1927.

1,637,945

UNITED STATES PATENT OFFICE.

FREDERICK KERSHAW, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA.

VENEER DRIER.

Application filed November 6, 1925. Serial No. 67,410.

One object of my invention is to construct a machine for drying veneers, and like materials, in such a manner that the veneers are conveyed through the drying chamber in close proximity to heating coils.

A further object of the invention is to so design the drier that air will be circulated in the drying chamber transversely to the movement of the conveyors, the air returning in channels above and below said chamber.

In the accompanying drawings:

Fig. 1 is a plan view of a veneer drier illustrating my invention;

Fig. 2 is a side view of the drier;

Figure 3:
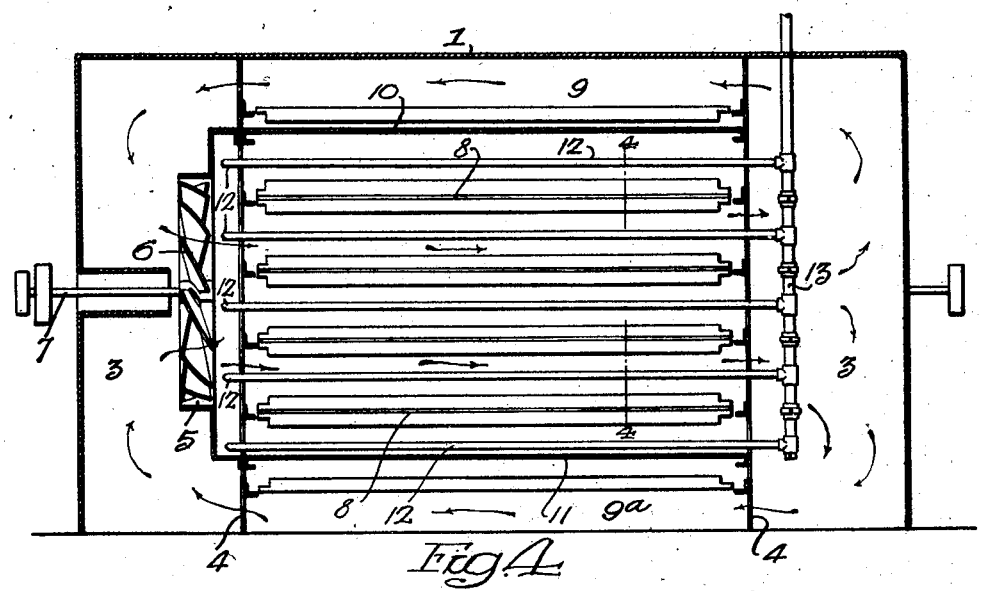
Fig. 3 is a transverse sectional view on the line 3—3, Fig. 2.

In the casing 3 of the drier is a longitudinal drying chamber 2, separated from circulating chambers 3 at each side by vertical partitions 4, in which are openings 5 for the circulating fans 6 mounted on shafts 7, and driven in the manner shown in outline in Figs. 1 and 2. It will be understood that the method of driving the fans may be modified without departing from the main features of the invention.

The conveyors 8 for the veneers are of the usual form, the upper run of one conveyor being in close proximity to the lower run of the conveyor directly above it, as shown in Fig. 2. The veneer is carried between the two runs of the conveyor from one end of the drier to the other. The conveyors are driven in the present instance by gearing at one end of the drier.

The drying chamber 2 is separated from the return circulating passage 9—9ª by an upper partition 10 and a lower partition 11. These circulating passages communicate at each end with the circulating chamber 3 at each side of the drier. The fans 6 circulate the air transversely through the drying chamber, the air returning through the opposite side circulating chamber and the upper and lower circulating passages as clearly indicated by the arrows in Fig. 3.

In order to heat the air and the veneers being conveyed, a series of steam coils 12 are arranged horizontally between the advancing and return runs of each conveyor. These coils are connected to vertical manifold pipes 13 located in the side circulating chamber opposite the one occupied by a fan. By this construction, the veneers are conveyed in close proximity to the heating means, while warm air is circulated in the spaces between the pipes and the runs of the conveyors carrying the veneers.

The drier in the present instance is divided by transverse partitions 14 into compartments 15, the air in each compartment being circulated by a fan. Doors 16 are located at each side of the drier, which may be open to any degree desired to admit air. Exhaust pipes 17 are located at different points to carry off the moist air from certain compartments. In the pipes are exhaust fans of the usual construction.

My invention may be used in any form of drier in which the air circulates transversely of the travel of the conveyor. While my invention is primarily a veneer drier, it will be understood that it can be used for drying any boards heavier than veneers or boards of any type, and while I prefer to arrange the conveyors so that the lower run of one conveyor will hold the material being dried upon the upper run of another conveyor, in some types of heavy boards the arrangement of the conveyors may be such that the material is simply carried by the upper run, as shown in Fig. 5.

Figure 4:
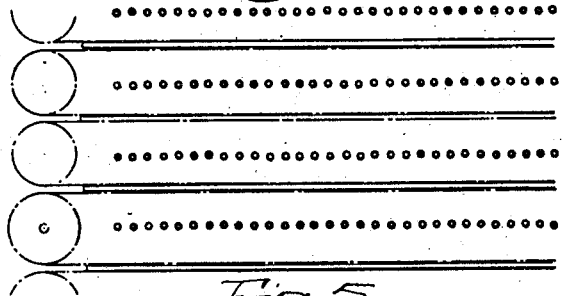
Fig. 4 is a diagrammatic view on the line 4—4, Fig. 3.
Figure 5:
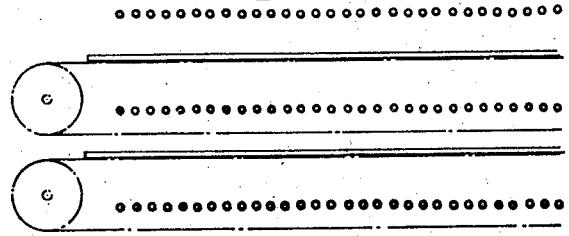
Fig. 5 is a diagrammatic view showing the relation of the heating pipes to the carrying run of a conveyor in which the material is not held by the return run of an adjoining conveyor.

In referring to Figs. 4 and 5, it will be seen that the heating pipes are of an equal distance from the carrying runs of the conveyors, although in some instances the pipes may be located directly under the carrying run.

I claim:

The combination in a drier, of a casing; two vertically arranged longitudinal partitions therein separating a central drying chamber from side circulating chambers;

two horizontal partitions separating the drying chamber from upper and lower circulating passages; fans in one of the vertical partitions; means for driving the fans so that air will pass transversely through the drying chamber, returning through the side circulating chambers and the upper and lower circulating chambers; a series of endless conveyors extending longitudinally in the drying chamber; and steam heating pipes located in the drying chamber between the upper and lower runs of certain conveyors.

FREDERICK KERSHAW.